UNITED STATES PATENT OFFICE.

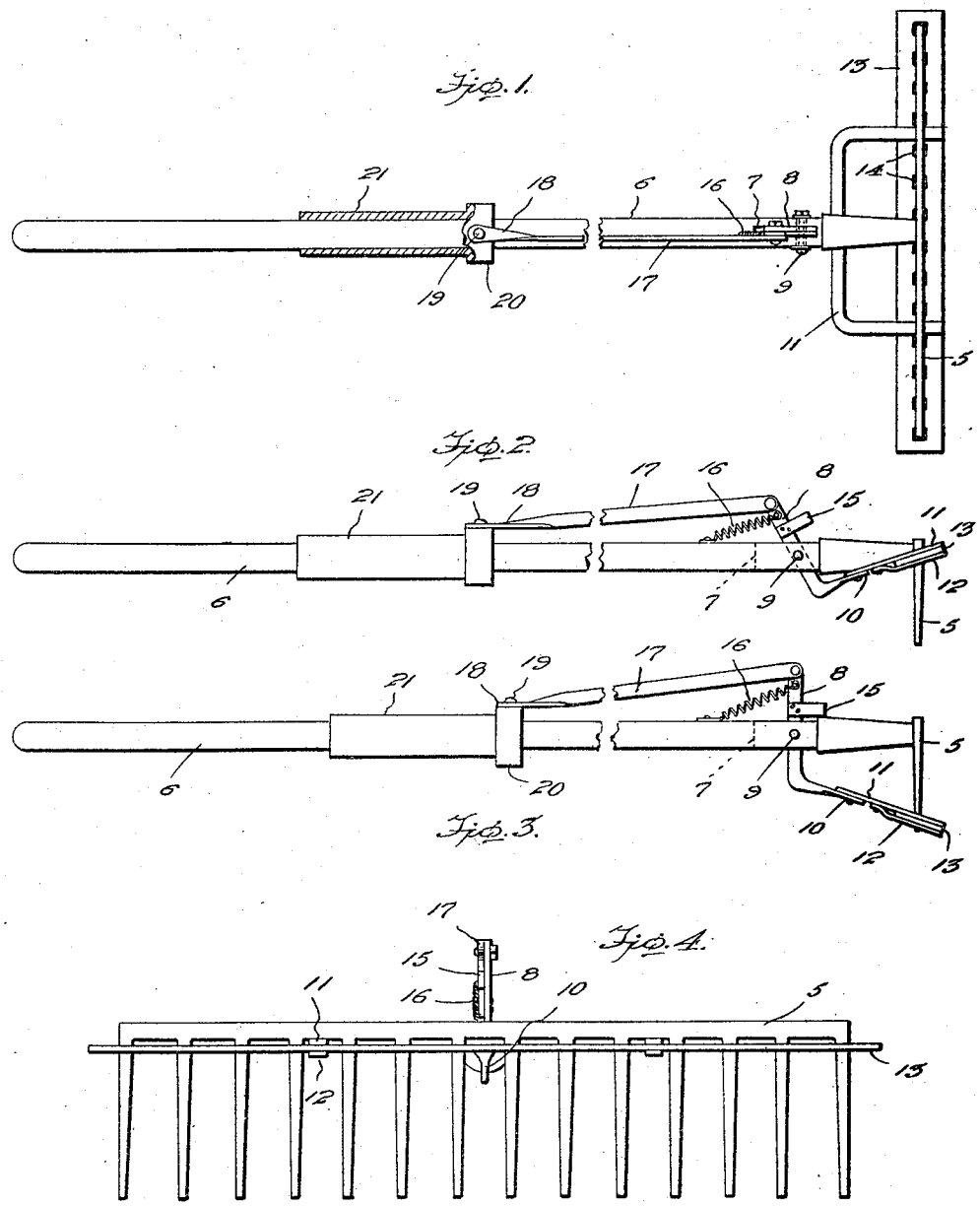

GEORGE E. BURDETT, OF LUBEC, MAINE.

RAKE-CLEANER.

1,230,664.   Specification of Letters Patent.   Patented June 19, 1917.

Application filed August 4, 1916. Serial No. 113,173.

*To all whom it may concern:*

Be it known that I, GEORGE E. BURDETT, a citizen of the United States, residing at Lubec, in the county of Washington and State of Maine, have invented certain useful Improvements in Rake-Cleaners, of which the following is a specification, reference being had therein to the accompanying drawing.

This invention relates to improvements in a non-clogging rake, one object of the invention being the provision of a rake provided with manually controlled means for removing obstructions from between the teeth of a rake so that the same may be maintained clear at all times.

A still further object of this invention is the provision of a device of this character which is simple, durable and inexpensive in construction and thoroughly efficient and practical in use.

In the accompanying drawings:—

Figure 1 is a plan view of the complete device.

Fig. 2 is a side elevation thereof.

Fig. 3 is a view similar to Fig. 2 showing the stripper in its extreme stripping position.

Fig. 4 is a view taken from the head of the rake.

Referring to the drawings, the numeral 5 designates the rake head proper which is mounted in the handle 6.

Formed in the handle is a slot 7 between which is mounted the lever 8 for swinging movement by means of the bolt 9.

The terminal 10 of the lever 8 is attached to the substantially U-shaped member 11 which has secured to the terminals thereof the members 12, so that the stripper member 13 may be attached between such terminals and the members 12 and be permitted to assume the positions as shown in Figs. 2 and 3, there being provided one opening 14 in the stripper plate 13 to each tooth of the rake.

Connected to the lever 8 above the pivotal point 9 thereof is a limiting member or stop 15 which limits the downward movement of the stripper plate 13 as illustrated in Fig. 3, while connected to said lever 8 at the opposite side to the stop 15 and to the handle 6 is a coil spring 16 which normally holds the stripper and parts in the position as shown in Fig. 2.

Connected to the upper end of the lever 8 is a connecting rod or link 17, whose twisted rear end 18 is connected by a screw 19 to the enlarged lever 20 of the hand gripping sleeve 21 which is mounted for sliding movement upon the handle 6.

From the foregoing description, it is evident that with the parts in position as shown in Figs. 1 and 2, the teeth of the rake are exposed to be presented in the usual manner.

Should they become clogged by grass, leaves, weeds, and the like, and it is desired to strip the teeth, it is merely necessary to move the sleeve 21 from the position shown in Fig. 2 to that shown in Fig. 3 which causes the stripper 13 to move downwardly and thus remove the debris from the teeth, the release of the sleeve 21 permitting the spring 16 to return the parts to the position as shown in Fig. 2.

By means of the stop 15, the stripper 13 is prevented from entirely leaving the teeth of the rake during the stripping operation.

What I claim as new is:—

In a device of the kind described, in combination, a rake head, a handle secured to said head and provided with a slot, a pin spanning said slot, a bell crank lever having one arm fulcrumed between its ends upon said pivot, a stripper plate having a series of relatively large openings through which the teeth of said rake project, a connecting member securing said plate upon the opposite arm of said lever, a slidable gripping sleeve telescoping on said handle, a coiled spring secured at one end upon said handle, inclining forwardly and attached at its free end to the outer end of the fulcrumed arm of said lever in a manner to hold the same diagonally of the length of said handle whereby said stripper plate will be disposed normally at the inner edge of said rake, and a right angularly disposed arm secured on the fulcrumed arm of said lever and serving as a stop and adapted to engage said handle so as to position said plate toward the outer end of said rake.

In testimony whereof I affix my signature.

EDWARD BURDETT.

Copies of this patent may be obtained for five cents each, by addressing the "Commissioner of Patents, Washington, D. C."